UNITED STATES PATENT OFFICE.

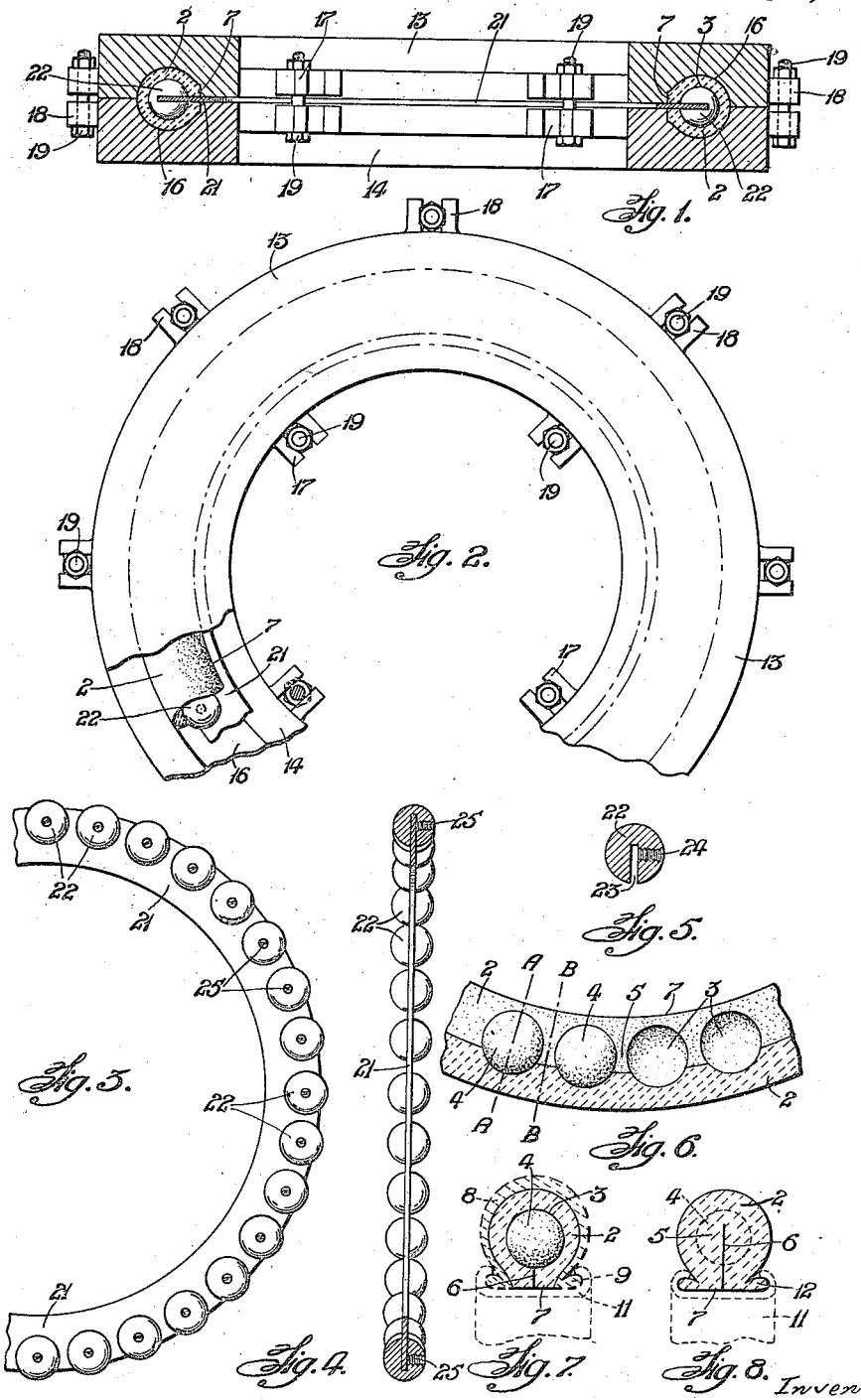

THOMAS H. CHANNON, OF FITZROY, MELBOURNE, VICTORIA, AUSTRALIA.

MANUFACTURE OF RESILIENT TIRES AND APPARATUS THEREFOR.

1,424,802.   Specification of Letters Patent.   Patented Aug. 8, 1922.

Application filed January 3, 1922. Serial No. 526,659.

*To all whom it may concern:*

Be it known that I, THOMAS HENRY CHANNON, a subject of the King of Great Britain and Ireland, and a resident of the city of Fitzroy, a suburb of the city of Melbourne, in the county of Bourke, State of Victoria, Commonwealth of Australia, have invented certain new and useful Improvements in Manufacture of Resilient Tires and Apparatus Therefor, of which the following is a specification.

This invention relates to resilient tires of the type comprising a rubber or like flexible body within which is a series of circumferentially spaced hollow flexible air balls or cushions which provide the necessary resiliency without danger of collapse of the tire through puncture or blow-out.

The object of the invention is to provide an improved means or devices for making a tire of the above nature, whereby the manufacture of the tire is facilitated and its efficiency is increased.

Referring to the drawings which form part of this specification:—

Figure 1 is a sectional view showing the tire within the mould during manufacture.

Figure 2 is a fragmental plan of Figure 1, a portion of the mould being broken away to show the tire and the interior of the mould.

Figure 3 is a side view showing portion of an annular dividing plate and the cores by which pockets are formed in the tire to accommodate the air balls or cushions.

Figure 4 is a cross section of the device seen in Figure 3.

Figure 5 is a detail view of one of the cores seen in Figures 3 and 4.

Figure 6 is a side sectional view of a portion of the tire some of the air balls being shown in place and others removed to show the pockets which accommodate them.

Figure 7 is a cross section on line A—A of Figure 6 and showing in dotted lines a cover and wheel rim.

Figure 8 is a section on line B—B of Figure 6 and illustrating the construction of the tire when no separate cover is employed.

A tire constructed in accordance with the invention comprises a rubber or like body 2 having formed therein a series of circumferentially spaced pockets 3 of spherical or other suitable shape. These pockets are separated by partitions 5 integral with the tire body 2 and are adapted to accommodate hollow flexible air balls or cushions 4. Said air cushions are constructed of rubber or the like and are inflated with compressed air to any desired pressure.

The inner portion of the tire body 2 is circumferentially split or divided as at 6, this dividing slit extending from the inner periphery 7 of the tire to near the centre thereof as illustrated in Figure 8. The dividing slit 6 thus formed intersects the partitions 5 and connects the pockets 3 so that by opening out the inner divided portion of the tire body the air balls or cushions 4 may be readily introduced into or removed from said pockets. By this means any of the balls or cushions may be removed for inspection or renewal in the event of injury.

As seen in Figure 7 the tire body 2 may be enclosed in an ordinary outer casing 8 provided with the usual bead 9 to engage the wheel rim 11, or as seen in Figure 8 such cover may be dispensed with and the body 2 provided with integral beads 12 to engage the wheel rim 11. In the latter case the outer or tread portion of the body 2 may be thickened as desired and provided with any suitable form of non-skid or other tread surface.

In the manufacture of the tire a mould constructed in two halves 13 and 14 is employed, the two half moulds being each provided with an annular moulding cavity 16 and with inner and outer lugs 17, 18 respectively to accommodate bolts 19 by which the two halves of the mould are drawn together.

In combination with said mould a dividing plate 21 in the form of a flat ring as seen in Figures 3 and 4 is employed. Secured to the outer portion of said dividing ring is a series of cores 22 of spherical or other form, these cores being of the requisite size and spaced at desired intervals around the dividing plate or ring 21.

Each of said cores is preferably provided with an open mouthed gullet 23 extending from the side of the core radially inwards to near its center. Each core is also provided with a screw threaded hole 24 extending from the surface of the core to the gullet 23 at right angles to the latter and accommodating a countersunk screw 25. Thus by passing the gullets 23 over the edge of the circular dividing plate 21 and tightening up the screws 25 the balls may be firmly but detachably secured to the dividing plate, thereby enabling balls of different sizes to be attached to said plate and spaced at any desired intervals thereon according to the size and disposition of the pockets 3 to be formed in the tire.

As seen in Figure 1 the dividing plate 21 is placed between the two half moulds 13 and 14, with the cores 22 disposed within the cavities 16 in said moulds, the rubber to form the tire body 2 being placed within said cavities prior to the bolting together of the half moulds. The rubber is then compressed around the cores and vulcanized in the usual manner so that the series of pockets 3 is formed in the tire by the cores and the circumferential dividing slit 6 connecting such pockets is formed by the dividing plate as will be evident from Figure 1.

When the tire has been thus formed, the two half moulds are taken apart and the cores removed with the dividing plate through the circumferential slit or opening 6. The air balls or cushions 4 are now introduced into the pockets through said slit or opening and the latter is then closed by bringing together its edges. If desired, the slit 6 may be sealed after the introduction of the air cushions, by vulcanizing or other means such as uniting its edges with a rubber solution. By leaving the dividing slit unsealed however, and keeping it closed merely by the attachment of the tire to the wheel rim, the tire may be opened out when removed from the rim, thus affording access to the balls or cushions for renewal or other purposes.

It will be evident that although spherical air cushions or balls as above described are preferable, the invention is not limited thereto, as the air cushions may be of cylindrical or other desired shape according to requirements, the cores 22 being shaped accordingly.

By the invention a strong, serviceable and highly efficient non-puncturable tire may be constructed in a simple and economical manner, the tire being usable as aforesaid either with or without an outer cover, whilst the size and shaping of the pockets and air cushions may be varied in accordance with requirements by varying the size and disposition of the cores upon the dividing ring as aforesaid.

Having now described my invention, what I claim as new and desire to secure by Letters Patent is:—

1. In means for making a resilient tire of the kind indicated, a circular dividing plate, in combination with a series of cores each of which is provided with an open mouthed gullet to receive the outer portion of said plate, and screws passing through threaded holes in said cores to retain them to the dividing plate, substantially as and for the purpose specified.

2. In means for making a resilient tire of the kind indicated, a dividing plate in the form of a flat ring, in combination with a series of cores each having therein an open mouthed gullet extending radially from the outer surface towards the centre of the core, a threaded hole extending from the surface of the core to said gullet at right angles thereto, and a countersunk screw accommodated by said threaded hole to engage one side of the dividing ring, the outer portion of which is accommodated by said gullet, substantially as and for the purpose specified.

3. In means for making a resilient tire of the kind indicated, comprising in combination a mould constructed in two halves each of which is provided with a moulding cavity adapted to coincide with the cavity of the other half mould, inner and outer lugs on said half moulds, bolts adapted to engage said lugs to clamp the half moulds together, an annular dividing plate adapted to be disposed between said half moulds and to project into said moulding cavity, and a series of circumferentially spaced cores detachably secured to said dividing plate at its outer circumference and adapted for disposal within the moulding cavity, substantially as and for the purpose set forth.

4. A method of manufacturing resilient tires, comprising moulding the rubber for forming the tire about an annular division plate having a series of circumferentially-spaced cores thereon, so as to produce in the moulded tire an internal series of pockets, and a continuous slit in the inner periphery of the tire intersecting said pockets; removing said plate and its cores through said slit after the completion of the moulding operation; and thereafter inserting cushioning elements through said slit to conformably fit in said pockets.

5. A method of manufacturing resilient tires, comprising moulding the rubber for forming the tire about an annular division plate provided on its outer peripheral edge with a series of spaced, spherical cores, so as to produce in the inner periphery of the moulded tire a continuous, centrally located slit and in the interior of the tire a series of spaced, spherical pockets which are intersected by the slit; removing said plate and its cores through said slit after the moulding has been completed; and thereafter inserting resilient balls through the slit to conformably fit in said pockets.

In testimony whereof I affix my signature.

THO. H. CHANNON.

Witness:
CECIL W. LE PLASTRIER.